US009563812B2

(12) United States Patent
Yasunaga et al.

(10) Patent No.: US 9,563,812 B2
(45) Date of Patent: Feb. 7, 2017

(54) IMAGE PROCESSING APPARATUS, IMAGE PROCESSING METHOD AND COMPUTER-READABLE STORAGE MEDIUM

(71) Applicant: TOSHIBA TEC KABUSHIKI KAISHA, Tokyo (JP)

(72) Inventors: Masaaki Yasunaga, Sunto Shizuoka (JP); Kazuki Taira, Tokyo (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/681,933

(22) Filed: Apr. 8, 2015

(65) Prior Publication Data

US 2016/0300116 A1 Oct. 13, 2016

(51) Int. Cl.

| | |
|---|---|
| ***G06K 9/00*** | (2006.01) |
| ***G06K 9/18*** | (2006.01) |
| ***G06K 9/62*** | (2006.01) |
| ***G06K 9/46*** | (2006.01) |

(52) U.S. Cl.

CPC ............... *G06K 9/18* (2013.01); *G06K 9/4604* (2013.01); *G06K 9/6215* (2013.01)

(58) Field of Classification Search

CPC ....... G06K 9/18; G06K 9/4604; G06K 9/6215

USPC ................................ 382/180–182, 190, 225

See application file for complete search history.

(56) References Cited

U.S. PATENT DOCUMENTS 6,014,460 A * 1/2000 Fukushima .............. G06K 9/72 382/177
7,680,329 B2 * 3/2010 Akagi .................... G06K 9/342 382/178
7,844,115 B2 * 11/2010 Ohwa ............... G06F 17/30265 382/190
8,457,407 B2 * 6/2013 Wada ................ G06F 17/30274 382/182
2008/0063280 A1 * 3/2008 Hofman ............. G06K 9/00973 382/182

FOREIGN PATENT DOCUMENTS

JP 2013-206175 10/2013

OTHER PUBLICATIONS

Computer English Translation of Japanese Patent No. 2013-206175A, pp. 1-13.*

* cited by examiner

*Primary Examiner* — Daniel Mariam
(74) *Attorney, Agent, or Firm* — Patterson & Sheridan, LLP

(57) ABSTRACT

According to one embodiment, an image processing apparatus includes a calculation unit and a recognition unit. The calculation unit is configured to calculate a first similarity degree group which is composed of similarity degrees between respective characters constituting a first character string appearing on a first image and respective candidate characters in a candidate character group, and to calculate a second similarity degree group which is composed of similarity degrees between respective characters constituting a second character string appearing on a second image and the respective candidate characters in the candidate character group.

9 Claims, 4 Drawing Sheets

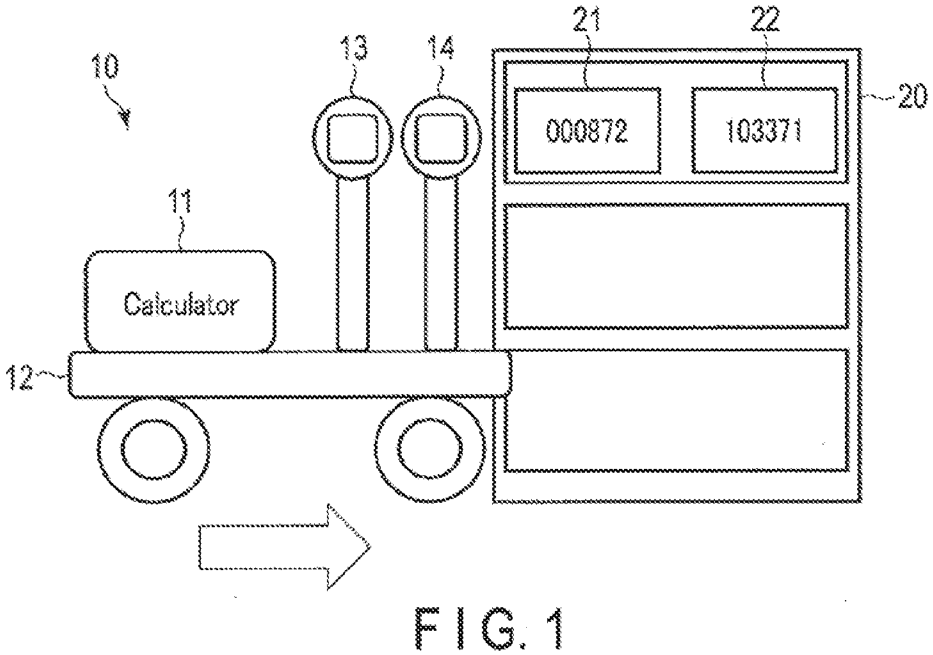
F I G. 1
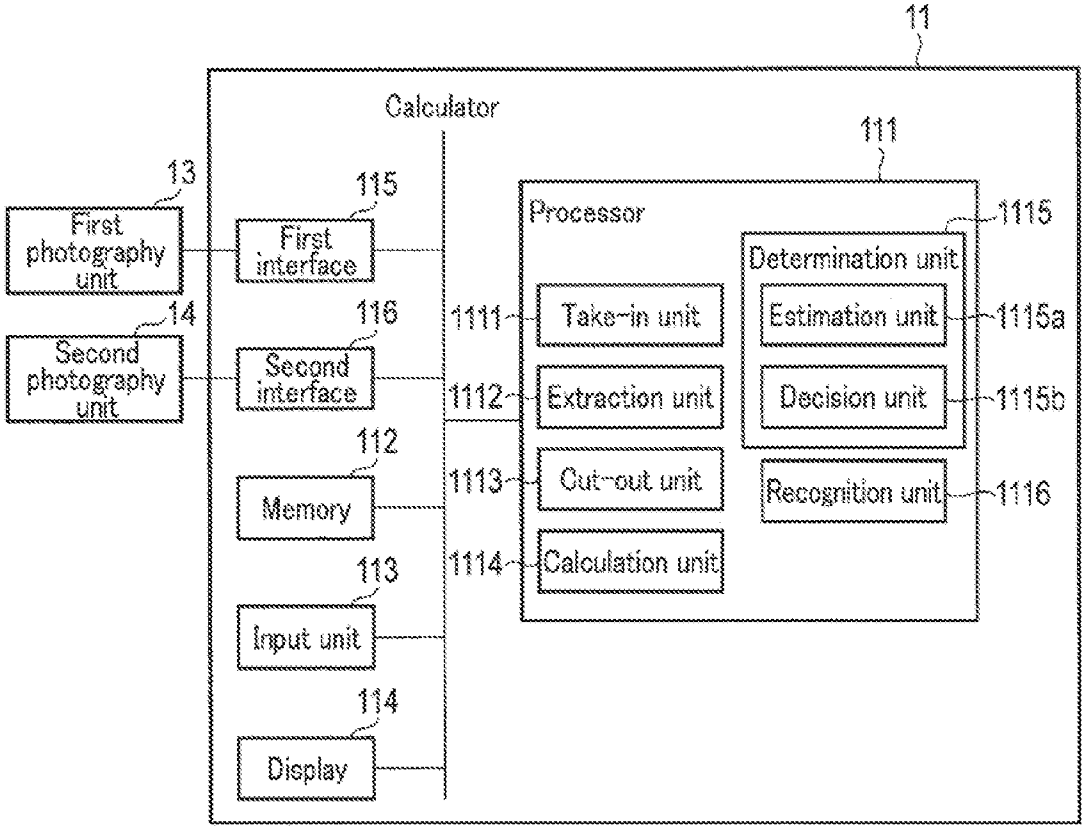
F I G. 2

〈First image: character string a1〉

| | 6th digit | 5th digit | 4th digit | 3rd digit | 2nd digit | 1st digit |
|---|---|---|---|---|---|---|
| 0 | 0.9 | 0.8 | 0.5 | 0.0 | 0.0 | 0.0 |
| 1 | 0.0 | 0.0 | 0.0 | 0.0 | 0.1 | 0.0 |
| 2 | 0.0 | 0.0 | 0.0 | 0.0 | 0.0 | 0.6 |
| 3 | 0.0 | 0.0 | 0.0 | 0.1 | 0.0 | 0.0 |
| 4 | 0.1 | 0.0 | 0.0 | 0.0 | 0.0 | 0.0 |
| 5 | 0.0 | 0.0 | 0.0 | 0.0 | 0.0 | 0.4 |
| 6 | 0.0 | 0.0 | 0.2 | 0.0 | 0.0 | 0.1 |
| 7 | 0.0 | 0.0 | 0.0 | 0.0 | 0.8 | 0.0 |
| 8 | 0.1 | 0.1 | 0.2 | 0.6 | 0.0 | 0.0 |
| 9 | 0.0 | 0.1 | 0.2 | 0.3 | 0.2 | 0.0 |

Recognition result
000872

〈Second image: character string a2〉

| | 6th digit | 5th digit | 4th digit | 3rd digit | 2nd digit | 1st digit |
|---|---|---|---|---|---|---|
| 0 | 0.8 | 0.9 | 0.4 | 0.0 | 0.0 | 0.0 |
| 1 | 0.0 | 0.0 | 0.0 | 0.0 | 0.2 | 0.0 |
| 2 | 0.0 | 0.0 | 0.0 | 0.0 | 0.0 | 0.7 |
| 3 | 0.0 | 0.0 | 0.1 | 0.1 | 0.0 | 0.0 |
| 4 | 0.1 | 0.0 | 0.0 | 0.0 | 0.0 | 0.0 |
| 5 | 0.0 | 0.0 | 0.0 | 0.0 | 0.0 | 0.3 |
| 6 | 0.1 | 0.0 | 0.2 | 0.1 | 0.0 | 0.2 |
| 7 | 0.0 | 0.0 | 0.0 | 0.0 | 0.9 | 0.0 |
| 8 | 0.2 | 0.2 | 0.5 | 0.5 | 0.0 | 0.0 |
| 9 | 0.0 | 0.1 | 0.1 | 0.3 | 0.1 | 0.0 |

Recognition result
008872

〈First image: character string b1〉

| | 6th digit | 5th digit | 4th digit | 3rd digit | 2nd digit | 1st digit |
|---|---|---|---|---|---|---|
| 0 | 0.0 | 0.8 | 0.0 | 0.0 | 0.0 | 0.0 |
| 1 | 0.8 | 0.0 | 0.0 | 0.0 | 0.2 | 0.8 |
| 2 | 0.0 | 0.0 | 0.0 | 0.0 | 0.0 | 0.0 |
| 3 | 0.0 | 0.0 | 0.6 | 0.8 | 0.0 | 0.0 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.2 | 0.0 | 0.1 | 0.0 | 0.0 | 0.0 |
| 7 | 0.2 | 0.0 | 0.0 | 0.0 | 0.8 | 0.2 |
| 8 | 0.0 | 0.3 | 0.3 | 0.2 | 0.0 | 0.1 |
| 9 | 0.0 | 0.1 | 0.0 | 0.1 | 0.2 | 0.0 |

Recognition result
103371

〈Second image: character string b2〉

| | 6th digit | 5th digit | 4th digit | 3rd digit | 2nd digit | 1st digit |
|---|---|---|---|---|---|---|
| 0 | 0.0 | 0.7 | 0.0 | 0.0 | 0.0 | 0.0 |
| 1 | 0.4 | 0.0 | 0.0 | 0.0 | 0.2 | 0.9 |
| 2 | 0.0 | 0.0 | 0.0 | 0.0 | 0.0 | 0.0 |
| 3 | 0.0 | 0.0 | 0.4 | 0.6 | 0.0 | 0.0 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.2 | 0.0 | 0.1 | 0.1 | 0.0 | 0.0 |
| 7 | 0.5 | 0.0 | 0.0 | 0.0 | 0.8 | 0.2 |
| 8 | 0.0 | 0.2 | 0.5 | 0.2 | 0.0 | 0.0 |
| 9 | 0.0 | 0.2 | 0.0 | 0.1 | 0.1 | 0.0 |

Recognition result
708371

FIG. 5

| | 6th digit | 5th digit | 4th digit | 3rd digit | 2nd digit | 1st digit |
|---|---|---|---|---|---|---|
| 0 | 0.85 | 0.85 | 0.45 | 0.00 | 0.00 | 0.00 |
| 1 | 0.00 | 0.00 | 0.00 | 0.00 | 0.15 | 0.00 |
| 2 | 0.00 | 0.00 | 0.00 | 0.00 | 0.00 | 0.65 |
| 3 | 0.00 | 0.00 | 0.05 | 0.10 | 0.00 | 0.00 |
| 4 | 0.10 | 0.00 | 0.00 | 0.00 | 0.00 | 0.00 |
| 5 | 0.00 | 0.00 | 0.00 | 0.00 | 0.00 | 0.35 |
| 6 | 0.05 | 0.00 | 0.20 | 0.05 | 0.00 | 0.15 |
| 7 | 0.00 | 0.00 | 0.00 | 0.00 | 0.85 | 0.00 |
| 8 | 0.15 | 0.15 | 0.35 | 0.55 | 0.00 | 0.00 |
| 9 | 0.00 | 0.10 | 0.15 | 0.30 | 0.15 | 0.00 |

IMAGE PROCESSING APPARATUS, IMAGE PROCESSING METHOD AND COMPUTER-READABLE STORAGE MEDIUM

FIELD

Embodiments described herein relate generally to an image processing apparatus, an image processing method and a computer-readable storage medium.

BACKGROUND

In general, an OCR (optical character recognition) process is executed on a character image acquired by reading a character written on paper by a scanner. In recent years, with an increase in resolution of cameras, an application is available which corrects a character image photographed by a camera, and executes an OCR process on the corrected character image. The OCR process can not merely analyze a character image and determine corresponding characters, but can also determine final characters while analyzing the meaning of a character string. In general, an OCR process of a character image photographed by a camera is executed on a character image with an adequate resolving power of, e.g. 200 dpi or more, for characters.

However, in an OCR process of a character image photographed by a camera, the character recognition rate for a low-resolution character image extremely lowers. Furthermore, as regards a low-resolution character image, the character recognition rate tends to vary depending on the quality of images. The quality of images greatly varies due to a slight difference in photography conditions, such as a photography timing of a character image, a photography position, and a photography environment (illumination). Thus, it is thought to execute an OCR process on only a character image with high quality. However, when character images with high quality cannot be obtained due to the photography environment, all character images are excluded from objects of the OCR process. This being the case, it is also thought that an OCR process is executed on a plurality of character images photographed at different timings or from plural positions, and final character recognition is executed based on a recognition result by plural OCR processes. However, if the recognition result by plural OCR processes divides into plural recognition results, the determination of final characters is difficult.

DESCRIPTION OF THE DRAWINGS

FIG. 1 is a schematic view of an image processing apparatus.

FIG. 2 is a block diagram of the image processing apparatus.

FIG. 5 is a view illustrating a plurality of similarity degree maps.

DETAILED DESCRIPTION

Figure 3:
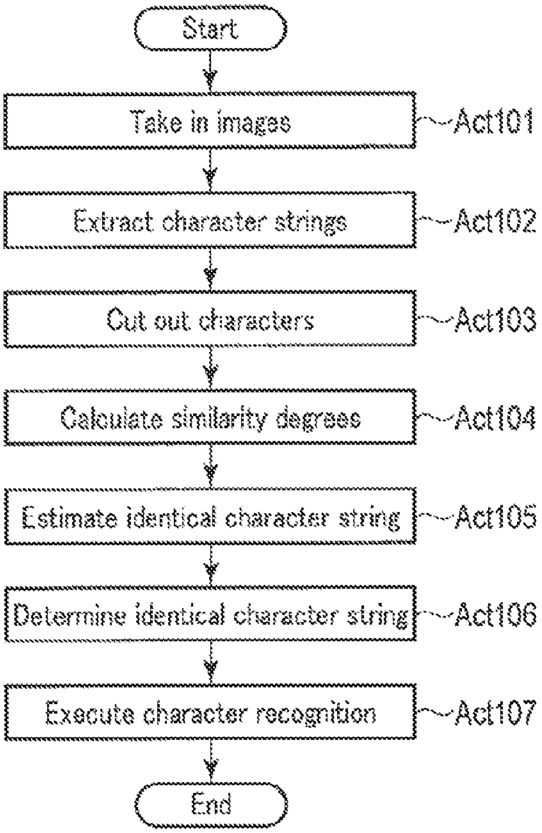
FIG. 3 is a flowchart of a process by the image processing apparatus.

In general, according to one embodiment, an image processing apparatus includes an extraction unit, a determination unit, a cut-out unit, a calculation unit, and a recognition unit. The extraction unit is configured to extract a first character string appearing on a first image, and a second character string appearing on a second image. The determination unit is configured to determine that both a subject of the first character string and a subject of the second character string correspond to a first subject. The cut-out unit is configured to cut out each of characters constituting the first character string, in units of a character, and to cut out each of characters constituting the second character string, in units of a character. The calculation unit is configured to calculate a first similarity degree group which is composed of similarity degrees between the respective characters constituting the first character string and respective candidate characters in a candidate character group, and to calculate a second similarity degree group which is composed of similarity degrees between the respective characters constituting the second character string and the respective candidate characters in the candidate character group. The recognition unit is configured to recognize a character string of the first subject, based on the first similarity degree group and the second similarity degree group.

Some embodiments will be described hereinafter with reference to the accompanying drawings.

First Embodiment

A first embodiment is described. FIG. 1 is a schematic view of an image processing apparatus 10 which is an example according to the first embodiment.

The image processing apparatus 10 is used for inventory management or location management of a plurality of articles (e.g. cardboard boxes) placed on a plurality of shelves in a warehouse or a shop. The image processing apparatus 10 includes a calculator 11, a moving body 12, a first photography unit 13 and a second photography unit 14. The image processing apparatus 10 does not necessarily need to include all of these elements. For example, the image processing apparatus 10 may be an apparatus including at least the calculator 11.

The calculator 11 is an apparatus which executes character recognition from an image by an OCR process, as will be described later. The calculator 11 is, for instance, a PC (Personal Computer). Incidentally, a character is a concept including an identification code, such as a numeral, a symbol, a sign or a mark. A character string is a string in which a plurality of digits of identification codes, such as numerals, symbols, signs or marks, are arranged.

The moving body 12 is a carriage which enables autonomous travel of the image processing apparatus 10 in any direction. The moving body 12 moves in a direction parallel to the direction of extension of linearly arranged shelves 20. The moving body 12 carries the calculator 11, first photography unit 13 and second photography unit 14.

The first photography unit 13 and second photography unit 14 are cameras which photograph an object. Incidentally, the object is also referred to as a subject in some cases. Each of the first photography unit 13 and second photography unit 14 may be a camera which photographs an object as a moving picture, or may be a camera which photographs an object as a still image. The first photography unit 13 and second photography unit 14 are fixed to the moving body 12 so as to photograph an identical object from different directions. The photography range of the first photography unit 13 and the photography range of the second photography unit 14 overlap. The relative positions and the photography directions of the first photography unit 13 and second photography unit 14 are already known. The object is a character string of a label attached to each of a plurality of articles placed on the shelves 20. For example, "000872" is described on the label of an article 21, and "103371" is described on the label of an article 22. The character string described on the label is ID (identification) information which is uniquely allocated to each article in order to identify the article. In general, the character strings of all labels attached to plural articles, which are managed in a certain area, have the same number of digits, and are combinations of predetermined characters. In the example illustrated in FIG. 1, each character string is composed of six digits and a combination of 0~9 in the respective digits. The first photography unit 13 and second photography unit 14 successively photograph the labels attached to plural articles placed on the shelf 20. The first photography unit 13 and second photography unit 14 send data of acquired images to the calculator 11.

FIG. 2 is a block diagram of the image processing apparatus 10 which is an example according to the first embodiment. FIG. 2 mainly illustrates the configuration of the calculator 11. The calculator 11 includes a processor 111, a memory 112, an input unit 113, a display 114, a first interface 115 and a second interface 116.

The processor 111 corresponds to a central part of the calculator 11. The processor 111 controls the respective elements of the calculator 11 in accordance with an operating system or an application program. The processor 111 includes a take-in unit 1111, an extraction unit 1112, a cut-out unit 1113, a calculation unit 1114, a determination unit 1115 including an estimation unit **1115*a* and a decision unit 1115*b*, and a recognition unit 1116**. The contents of processes by these elements will be described later.

The memory 112 includes a memory which stores the above-described operating system and application program. The memory 112 further includes a memory serving as a work area that is necessary for processes by the processor 111. Moreover, the memory 112 includes a memory which stores data that is necessary for processes by the processor 111.

The input unit 113 is a keyboard which can input a command to the calculator 11.

The display 114 is a display which displays video, based on a signal from the processor 111. The display 114 is an output unit of video.

The first interface 115 connects the calculator 11 and the first photography unit 13. The calculator 11 takes in data of images from the first photography unit 13 via the first interface 115.

The second interface 116 connects the calculator 11 and the second photography unit 14. The calculator 11 takes in data of images from the second photography unit 14 via the second interface 116.

Next, a process of character recognition by the image processing apparatus 10 is described. Images, which the image processing apparatus 10 processes, are, for example, images with low resolutions which the first photography unit 13 and second photography unit 14 captured by photographing the labels attached to plural articles placed on the shelf 20 from far positions. It is thus assumed that the image by the first photography unit 13 and the image by the second photography unit 14 enable recognition (reading) of a character string by a person but do not enable adequate character recognition by a general OCR process by the image processing apparatus 10.

FIG. 3 is a flowchart of a process by the image processing apparatus 10 which is an example according to the first embodiment.

The take-in unit 1111 of the processor 111 takes in images (Act 101). In Act 101, the processor 111 takes in data of a first image, which the first photography unit 13 acquired, and data of a second image, which the second photography unit 14 acquired, via the first interface 115 and second interface 116. The memory 112 stores the data of the first image and the data of the second image. A character string (hereinafter referred to as "first subject"), which is an object of character recognition, appears on the first image and second image. Incidentally, a character string, which is other than the first subject, may appear on the first image and second image.

The extraction unit 1112 of the processor 111 extracts character strings (Act 102). In Act 102, the processor 111 extracts all character strings appearing on the first image. Similarly, the processor 111 extracts all character strings appearing on the second image. In the description below, for the purpose of simplicity, a process on a first character string, which appears on the first image, and a process on a second character string, which appears on the second image, are illustrated. The processor 111 extracts the first character string appearing on the first image. Similarly, the processor 111 extracts the second character string appearing on the second image. The extraction process of character strings in Act 102 may be an arbitrary method used in the OCR process.

The cut-out unit 1113 of the processor 111 cuts out characters (Act 103). In Act 103, the processor 111 cuts out each of the characters which constitute the first character string, in units of a character. Similarly, the processor 111 cuts out each of the characters which constitute the second character string, in units of a character. The cut-out process of characters in Act 103 may be an arbitrary method used in the OCR process.

The calculation unit 1114 of the processor 111 calculates a similarity degree (Act 104). In Act 104, the processor 111 calculates a similarity degree between each of the characters constituting the first character string and each of candidate characters in a candidate character group. Thereby, the processor 111 calculates a first similarity degree group which is composed of similarity degrees between the respective characters constituting the first character string and the respective candidate characters in the candidate character group. Specifically, the processor 111 calculates similarity degrees, the number of which corresponds to the number of candidate characters, with respect to each of the digits of the first character string. Similarly, the processor 111 calculates a similarity degree between each of the characters constituting the second character string and each candidate character in the candidate character group. Thereby, the processor 111 calculates a second similarity degree group which is composed of similarity degrees between the respective characters constituting the second character string and the respective candidate characters in the candidate character group. Specifically, the processor 111 calculates similarity degrees, the number of which corresponds to the number of candidate characters, with respect to each of the digits of the second character string.

The candidate character group used in the above-described Act 104 is composed of a plurality of candidate characters. The plurality of candidate characters are composed of a plurality of predetermined characters which are usable as a character string for identifying each article. For example, the plural candidate characters are numerals of 0 to 9. The candidate character group is stored in the memory 112. It is possible that the candidate character group varies in accordance with areas where articles are managed. Thus, the memory unit 112 may store data of candidate character groups which are different between the areas.

The above-described similarity degree calculated in Act 104 is an index indicative of a possibility (probability) that each character constituting the first character string and each character constituting the second character string agrees with each candidate character. The calculation method of similarity degrees in Act 104 may be an arbitrary method. Incidentally, the range of the similarity degree is not specifically limited. For example, the range of the similarity degree may be 0 to 1, or 0 to 100. The similarity degree, which is closer to the upper limit value, may indicate a higher similarity to the candidate character, and the similarity degree, which is closer to the lower limit value, may indicate a lower similarity to the candidate character. Alternatively, the similarity degree, which is closer to the lower limit value, may indicate a higher similarity to the candidate character, and the similarity degree, which is closer to the higher limit value, may indicate a lower similarity to the candidate character. For example, the processor 111 can calculate each similarity degree such that candidate characters have no relationship of dependency. Specifically, in each digit of the first character string, the respective similarity degrees included in the first similarity degree group have no relationship of dependency. The value of the sum of similarity degrees in each digit of the first character string is not normalized to 100%. The same applies to the similarity degrees in the second character string. Specifically, in each digit of the second character string, the respective similarity degrees included in the second similarity degree group have no relationship of dependency. In this case, when the processor 111 calculates the similarity degree of a certain candidate character in the same digit, the processor 111 is not influenced by the values of similarity degrees of other candidate characters. Therefore, the processor 111 can calculate similarity degrees with high certainty, with the candidate characters being independent from each other.

Conversely, the processor 111 may calculate each similarity degree such that candidate characters have a relationship of dependency. Specifically, in each digit of the first character string, the respective similarity degrees included in the first similarity degree group have a relationship of dependency. The value of the sum of similarity degrees in each digit of the first character string is normalized to 100%. The same applies to the similarity degrees in the second character string. Specifically, in each digit of the second character string, the respective similarity degrees included in the second similarity degree group have a relationship of dependency. In this manner, each similarity degree included in the first similarity degree group and each similarity degree included in the second similarity degree group is a likelihood. In this case, the processor 111 can calculate as to with which candidate character the character of each of digits constituting the first character string agrees at a high possibility. Similarly, the processor 111 can calculate as to with which candidate character the character of each of digits constituting the second character string agrees at a high possibility.

The estimation unit **1115*a* of the processor 111 estimates an identical character string (Act 105). In Act 105, the processor 111 estimates that it is highly possible that the first subject exists in both the first image and second image. The reason for this is that the first photography unit 13 and second photography unit 14** photograph the same object from different directions.

The decision unit **1115*b* of the processor 111 determines the identical character string (Act 106). In Act 106, the processor 111 can determine which of the character strings extracted from the first image and which of the character strings extracted from the second image correspond to the identical subject, based on the positional relationship between the first photography unit 13 and second photography unit 14, the position of the character string appearing on the first image, and the position of the character string appearing on the second image. Specifically, the processor 111 can associate, in units of a subject, the character string extracted from the first image and the character string extracted from the second image. This is because the relative positions and photography directions of the first photography unit 13 and second photography unit 14 are already known. For example, the processor 111 uses a trigonometrical survey based on the positional relationship between the first photography unit 13 and second photography unit 14**.

As described above, in Act 105 and Act 106, the determination unit 1115 of the processor 111 determines that both the subject of the first character string and the subject of the second character string correspond to the first subject. In an example, the processor 111 determines that both the subject of the first character string and the subject of the second character string correspond to the first subject, based on the positional relationship between the first photography unit 13 and second photography unit 14, the position of the first character string appearing on the first image and the position of the second character string appearing on the second image. In the meantime, the process in Act 105 and Act 106 may not be executed after Act 104, but may be executed between Act 102 and Act 103 or between Act 103 and Act 104.

The recognition unit 1116 of the processor 111 executes character recognition (Act 107). In Act 107, the processor 111 calculates a first calculation value group based on the value of the sum of similarity degrees included in the first similarity degree group and similarity degrees included in the second similarity degree group, in units of each of corresponding digits between the first character string and the second character string and in units of a candidate character in a candidate character group. Incidentally, the first calculation value group may be an added value between the similarity degrees included in the first similarity degree group and the similarity degrees included in the second similarity degree group, or may be an average value between the similarity degrees included in the first similarity degree group and the similarity degrees included in the second similarity degree group. Thereafter, the processor 111 extracts maximum values in the first calculation value group in the respective digits. Subsequently, the processor 111 recognizes a set of candidate characters corresponding to the maximum values in the respective digits as a character string in the first subject. In the above manner, the processor 111 recognizes the character string of the first subject, based on the first similarity degree group and second similarity degree group. The reason why the processor 111 uses both the first similarity degree group and the second similarity degree group is that there is a case in which the set of candidate characters corresponding to maximum values in the respective digits in the first similarity degree group differs from the set of candidate characters corresponding to maximum values in the respective digits in the second similarity degree group.

According to the first embodiment, the image processing apparatus 10 can enhance the recognition precision of character images appearing on low-resolution images, not only by using the OCR process of character strings, but also by executing character recognition with use of the above-described similarity degrees.

Incidentally, if the respective similarity degrees are calculated such that the candidate characters have no relationship of dependency, as described above, the precision of recognition of a character string by the image processing apparatus 10 is further enhanced. The reason for this is that the certainty of each similarity degree is high.

Next, a concrete example of the above-described process of character recognition by the image processing apparatus 10 is described with reference to FIG. 4 to FIG. 6.

Figure 4:
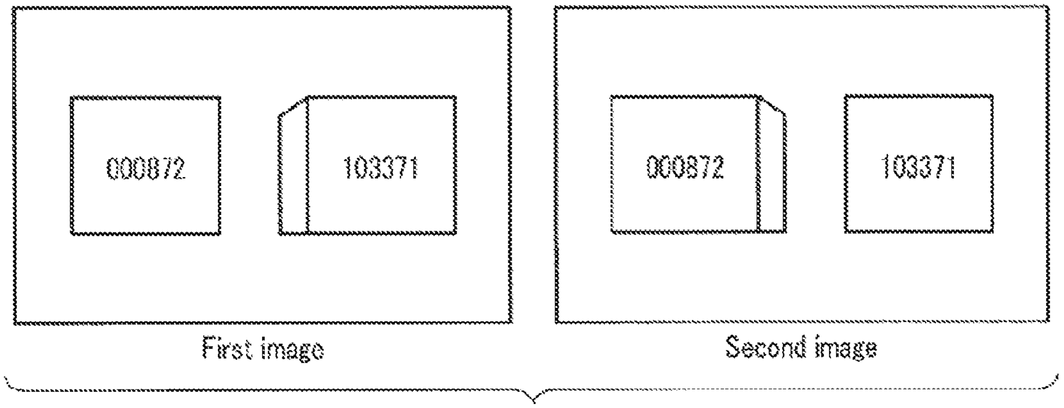
FIG. 4 is a view illustrating a plurality of images.

FIG. 4 is a view illustrating images which are an example according to the first embodiment. A left part of FIG. 4 illustrates a first image by the first photography unit 13. A right part of FIG. 4 illustrates a second image by the second photography unit 14. A character string "000872" (hereinafter referred to as "subject A") of a label, which is attached to the article 21 that is an object of character recognition, and a character string "103371" (hereinafter referred to as "subject B") of a label, which is attached to the article 22 that is an object of character recognition, appear on the first image and second image. As described above in Act 101, the processor 111 takes in the data of the first image which the first photography unit 13 acquired, and the data of the second image which the second photography unit 14 acquired, via the first interface 115 and second interface 116.

As described in Act 102, the processor 111 extracts a character string a1 corresponding to the subject A and a character string b1 corresponding to the subject B, the character string a1 and character string b1 appearing on the first image shown in FIG. 4. The processor 111 extracts a character string a2 corresponding to the subject A and a character string b2 corresponding to the subject B, the character string a2 and character string b2 appearing on the second image. As described in Act 103, the processor 111 cuts out, in units of a character, each of the characters constituting the character string a1 and character string b1. Similarly, the processor 111 cuts out, in units of a character, each of the characters constituting the character string a2 and character string b2.

FIG. 5 is a view illustrating a plurality of similarity degree maps, which are an example according to the first embodiment. The similarity degree maps correspond to the above-described first similarity degree group and second similarity degree group. An upper left part of FIG. 5 is a similarity degree map relating to the character string a1. A lower left part of FIG. 5 is a similarity degree map relating to the character string b1. An upper right part of FIG. 5 is a similarity degree map relating to the character string a2. A lower right part of FIG. 5 is a similarity degree map relating to the character string b2. As described in Act 104, the processor 111 calculates a similarity degree between each of the characters constituting the character string a1 and each of the candidate characters in the candidate character group. Thereby, the processor 111 calculates a similarity degree map which is composed of similarity degrees between the respective characters constituting the character string a1 and the respective candidate characters in the candidate character group. Similarly, the processor 111 calculates a similarity degree map relating to the character string b1, a similarity degree map relating to the character string a2, and a similarity degree map relating to the character string b2. The horizontal axis of the similarity degree map indicates the digits of the character string. Incidentally, each of the character string a1, character string b1, character string a2 and character string b2 is composed of six digits. The vertical axis indicates candidate characters. The candidate characters are composed of ten characters of 0 to 9. Accordingly, each similarity degree map is composed of 60 similarity degrees.

Each similarity degree map shown in FIG. 5 is an example in which the respective similarity degrees were calculated such that the candidate characters have no relationship of dependency in each of the digits, as described above. The similarity degree in FIG. 5 indicates that the similarity to the candidate character is higher as the similarity degree is closer to 1.0, and that the similarity to the candidate character is lower as the similarity degree is closer to 0.0.

A recognition result is indicated below each similarity degree map in FIG. 5. The recognition result is a set of arranged candidate characters which correspond to the maximum values of similarity degrees of the respective digits. As described in Act 105 and Act 106, the processor 111 determines that both the subject of the character string a1 and the subject of the character string a2 correspond to the subject A. However, the recognition result "000872" of the character string a1 differs from the recognition result "008872" of the character string a2. Similarly, the processor 111 determines that both the subject of the character string b1 and the subject of the character string b2 correspond to the subject B. However, the recognition result "103371" of the character string b1 differs from the recognition result "708371" of the character string b2. Thus, as described in Act 107, the processor 111 calculates a final similarity degree group based on the value of the sum of similarity degrees included in the similarity degree map of the character string a1 and similarity degrees included in the similarity degree map of the character string a2, in units of each of corresponding digits between the character string a1 and the character string a2 and in units of a candidate character in the candidate character group. The final similarity degree map corresponds to the above-described first calculation value group.

Figures 6, 7:
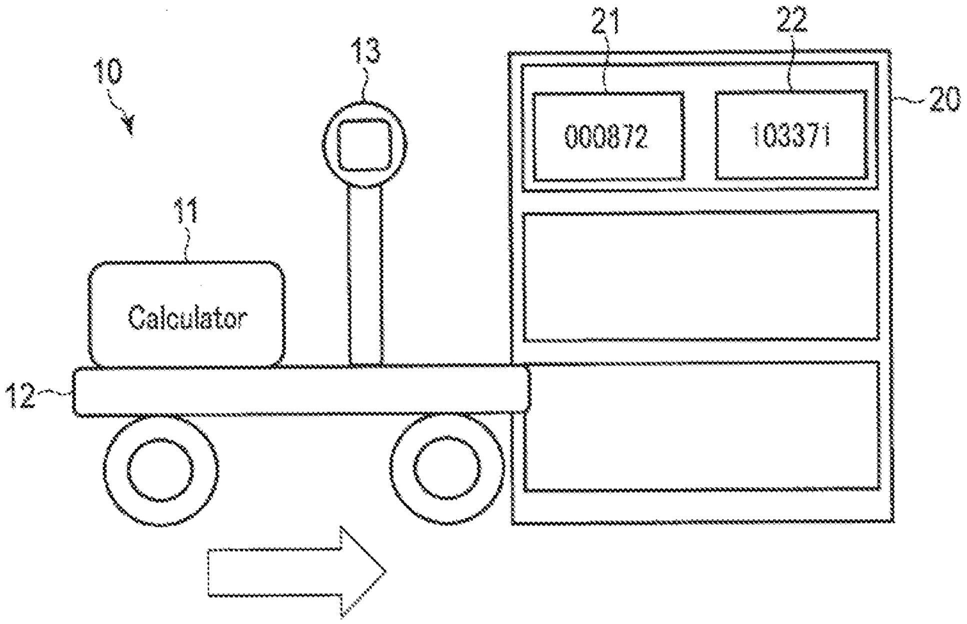
FIG. 6 is a view illustrating a final similarity degree map, which is an example according to the first embodiment.
FIG. 7 is a schematic view of an image processing apparatus.

FIG. 6 is a view illustrating a final similarity degree map, which is an example according to the first embodiment. The final similarity degree map illustrated in FIG. 6 is composed of average values between the similarity degrees included in the similarity degree map of the character string a1 and the similarity degrees included in the similarity degree map of the character string a2. The processor 111 extracts maximum values in the final similarity degree map in the respective digits. Subsequently, the processor 111 recognizes a set (hereinafter referred to as "recognition result") of candidate characters, "000872", which correspond to the maximum values in the respective digits, as the character string in the subject A. Similarly, the processor 111 recognizes the character string in the subject B, based on the similarity degree map of the character string b1 and the degree map of the character string b2. Although it is possible that the image processing apparatus 10 cannot exactly recognize the character string of the subject by the OCR process alone, the image processing apparatus 10 can recognize the character string of the subject with high precision by using the above-described similarity degrees.

In the meantime, in Act 107, the processor 111 may multiply each similarity degree included in the first similarity degree group by a first weighting factor, which depends on the position of a character string appearing on an image, based on the position of the second character string appearing on the second image. Similarly, the processor 111 may multiply each similarity degree included in the second similarity degree group by the first weighting factor, based on the position of the second character string appearing on the second image. For example, the first factor is such a factor as to decrease the weight at an end of an image, and to gradually increase the weight toward the center of the image. Even if the subject is identical, the position at which the subject appears differs between the first image and the second image. It is highly possible that a character string appearing at an end of an image has a greater distortion than a character string appearing at a central part of the image. Thus, the reliability of the similarity degree group by the character string appearing at the end of the image is lower than the reliability of of the similarity degree group by the character string appearing at the central part of the image. By correcting the similarity degree group by using the first weighting factor, the image processing apparatus 10 can recognize the character string of the subject with higher precision.

Incidentally, in Act 107, the processor 111 may multiply each similarity degree included in the first similarity degree group by a second weighting factor, which depends on pixel information of a character string appearing on an image, based on the pixel information of the second character string appearing on the second image. Similarly, the processor 111 may multiply each similarity degree included in the second similarity degree group by the second weighting factor, based on the pixel information of the second character string appearing on the second image. For example, the pixel information is a contrast. For example, the second factor is such a factor as to decrease the weight of a part with a low contrast, and to gradually increase the weight toward a part with a higher contrast. Since the first photography unit 13 and second photography unit 14 are different with respect to the photography position and direction, the contrast of the first image and the contrast of the second image are different. Besides, there is a case in which the contrast varies even within an identical image. The reliability of the similarity degree group by a character string appearing on a part with a low contrast is lower than the reliability of the similarity degree group by a character string appearing on a part with a high contrast. The processor 111 can vary the second weighting factor in accordance with the contrast in units of an image, in units of a character string, and in units of each of characters constituting a character string. By correcting the similarity degree group by using the second weighting factor, the image processing apparatus 10 can recognize the character string of the subject with higher precision.

In the meantime, in Act 107, the processor 111 may correct the recognition result based on the final similarity degree map, by a semantic analysis process according to a predetermined rule. Thereby, the image processing apparatus 10 can recognize the character string of the subject with higher precision.

Incidentally, the image processing apparatus 10 may recognize the character string of the subject, based on three or more similarity degree groups calculated from images from three or more photography units. Thereby, the image processing apparatus 10 can recognize the character string of the subject with higher precision.

Second Embodiment

A second embodiment is described. A description is given of points which are different from the first embodiment, and a description of the same points is omitted. FIG. 7 is a schematic view of an image processing apparatus 10 which is an example according to the second embodiment. The image processing apparatus 10 according to the second embodiment corresponds to an apparatus which is configured such that the second photography unit 14 and second interface 116 are excluded from the image processing apparatus 10 according to the first embodiment. Specifically, the image processing apparatus 10 according to the second embodiment includes only one photography unit which photographs an object.

The process of character recognition by the image processing apparatus 10 differs from the process of character recognition in the first embodiment with respect to Act 101, Act 105 and Act 106 in FIG. 3.

In Act 101, the processor 111 takes in data of a first image and a second image, which the first photography unit 13 acquired, via the first interface 115. The first image and second image are images which the first photography unit 13 acquired by photographing the first subject from different positions.

In Act 105 and Act 106, the determination unit 1115 of the processor 111 determines that both the subject of the first character string and the subject of the second character string correspond to the first subject. In an example, the processor 111 determines that both the subject of the first character string and the subject of the second character string correspond to the first subject, based on the amount of movement of the first photography unit 13, the position of the first character string appearing on the first image and the position of the second character string appearing on the second image. If the amount of movement of the first photography unit 13 agrees with the amount of movement between the position of the first character string appearing on the first image and the position of the second character string appearing on the second image, the processor 111 can determine that both the subject of the first character string and the subject of the second character string correspond to the first subject. Incidentally, the processor 111 may use the amount of movement of an arbitrary mark appearing on the first image and second image, in place of the amount of movement of the first photography unit 13.

The second embodiment can obtain the same advantageous effects as the above-described first embodiment.

As used in this application, entities for executing the actions can refer to a computer-related entity, either hardware, a combination of hardware and software, software, or software in execution. For example, an entity for executing an action can be, but is not limited to being, a process running on a processor, a processor, an object, an executable, a thread of execution, a program, and a computer. By way of illustration, both an application running on an apparatus and the apparatus can be an entity. One or more entities can reside within a process and/or thread of execution and a entity can be localized on one apparatus and/or distributed between two or more apparatuses.

The program for realizing the functions can be recorded in the apparatus, can be downloaded through a network to the apparatus and can be installed in the apparatus from a computer readable storage medium storing the program therein. A form of the computer readable storage medium can be any form as long as the computer readable storage medium can store programs and is readable by the apparatus such as a disk type ROM and a Solid-state computer storage media. The functions obtained by installation or download in advance in this way can be realized in cooperation with an OS (Operating System) or the like in the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:

a first interface configured to receive a first image from a first external apparatus;

a second interface configured to receive a second image from a second external apparatus, wherein the first image is different from the second image; and a processor configured to:

extract a first character string appearing on the first image, and a second character string appearing on the second image;

determine that both the first character string and the second character string correspond to a photographed subject in the first image and second image;

cut out each of the characters constituting the first character string, in units of a character;

cut out each of the characters constituting the second character string, in units of a character;

calculate a first similarity degree group which is composed of similarity degrees between the respective characters constituting the first character string and respective candidate characters in a candidate character group;

calculate a second similarity degree group which is composed of similarity degrees between the respective characters constituting the second character string and the respective candidate characters in the candidate character group; and recognize a character string of the first subject, based on the first similarity degree group and the second similarity degree group.

2. The image processing apparatus of claim 1, wherein:

the processor is further configured to determine that both the first character string and the second character string correspond to the subject, based on a positional relationship between the first external apparatus and the second external apparatus, a position of the first character string appearing on the first image, and a position of the second character string appearing on the second image, the first image is generated by the first external apparatus photographing the subject, and the second image is generated by the second external apparatus photographing the subject.

3. The image processing apparatus of claim 1, wherein the processor is further configured to:

calculate a first calculation value group based on a value of a sum of the similarity degrees included in the first similarity degree group and the similarity degrees included in the second similarity degree group, in units of each of corresponding digits between the first character string and the second character string and in units of a candidate character in the candidate character group, extract maximum values in the first calculation value group in the respective digits, and recognize a set of candidate characters corresponding to the maximum values as the character string in the first subject.

4. The image processing apparatus of claim 3, wherein the processor is further configured to:

multiply each of the similarity degrees included in the first similarity degree group by a first weighting factor, which depends on a position of a character string appearing on an image, based on a position of the second character string appearing on the second image, and multiply each of the similarity degrees included in the second similarity degree group by the first weighting factor, based on the position of the second character string appearing on the second image.

5. The image processing apparatus of claim 3, wherein the recognition unit processor is further configured to:

multiply each of the similarity degrees included in the first similarity degree group by a second weighting factor, which depends on pixel information of a character string appearing on an image, based on pixel information of the second character string appearing on the second image, and multiply each of the similarity degrees included in the second similarity degree group by the second weighting factor, based on the pixel information of the second character string appearing on the second image.

6. The image processing apparatus of claim 1, wherein each of the similarity degrees included in the first similarity degree group and each of the similarity degrees included in the second similarity degree group is a likelihood.

7. The image processing apparatus of claim 1, wherein the similarity degrees included in the first similarity degree group have no relationship of dependency, and the similarity degrees included in the second similarity degree group have no relationship of dependency.

8. An image processing method comprising:

extracting a first character string appearing on a first image received from a first external apparatus;

extracting a second character string appearing on a second image received from a second external apparatus, wherein the first image is different from the second image;

determining that both the first character string and the second character string correspond to a photographed subject in the first image and second image;

cutting out each of the characters constituting the first character string, in units of a character;

cutting out each of the characters constituting the second character string, in units of a character;

calculating a first similarity degree group which is composed of similarity degrees between the respective characters constituting the first character string and respective candidate characters in a candidate character group;

calculating a second similarity degree group which is composed of similarity degrees between the respective characters constituting the second character string and the respective candidate characters in the candidate character group; and recognizing a character string of the first subject, based on the first similarity degree group and the second similarity degree group.

9. A computer-readable, non-transitory storage medium having stored thereon a program which is executable by a computer, the program controlling the computer to execute functions of:

extracting a first character string appearing on a first image received from a first external apparatus;

extracting a second character string appearing on a second image received from a second external apparatus, wherein the first image is different from the second image;

determining that both the first character string and the second character string correspond to a first photographed subject in the first image and second image;

cutting out each of the characters constituting the first character string, in units of a character;

cutting out each of the characters constituting the second character string, in units of a character;

calculating a first similarity degree group which is composed of similarity degrees between the respective characters constituting the first character string and respective candidate characters in a candidate character group;

calculating a second similarity degree group which is composed of similarity degrees between the respective characters constituting the second character string and the respective candidate characters in the candidate character group; and recognizing a character string of the first subject, based on the first similarity degree group and the second similarity degree group.

* * * * *